United States Patent [19]

Quintiliani et al.

[11] 3,886,453

[45] May 27, 1975

[54] CARD-PROGRAMMED FREQUENCY CONTROL UNIT FOR A TRANSCEIVER

[75] Inventors: Saverio Michael Quintiliani; Alan Grad Finkel, both of Raleigh, N.C.; Harry Richard Smith, Verona, N.J.; Peter Anthony Damiano, Jr., Raleigh, N.C.; Douglas Michael Spranger, Brooklyn, N.Y.

[73] Assignee: International Telephone and Telegraph Corporation, Nutley, N.J.

[22] Filed: Apr. 18, 1974

[21] Appl. No.: 462,054

[52] U.S. Cl. ............... 325/25; 200/46; 235/61.6 H; 325/16; 340/147 P; 343/175

[51] Int. Cl. ............................................ H04b 1/50

[58] Field of Search ................................ 325/15–17, 325/21, 22, 25; 340/147 P, 171 R; 179/41 A; 200/46; 235/61.6 H, 61.6 K; 343/175

[56] References Cited

UNITED STATES PATENTS

| | | | |
|---|---|---|---|
| 3,576,407 | 4/1971 | Stephens, Jr. .......................... | 200/46 |
| 3,581,019 | 5/1971 | Ryan..................................... | 179/41 |
| 3,641,276 | 2/1972 | Keller et al. .................... | 179/18 BF |

*Primary Examiner*—Robert L. Griffin
*Assistant Examiner*—Marc E. Bookbinder
*Attorney, Agent, or Firm*—John T. O'Halloran; Menotti J. Lombardi, Jr.; Alfred C. Hill

[57] ABSTRACT

This relates to a marine type radiotelephone which is a frequency synthesized, autotuned high frequency single sideband transceiver. The channels with 100 Hz resolution in the high frequency maritime mobile bands and in the 1.6 MHz to 3.5 MHz band are provided by punched cards preprogrammed for mode of operation and in a binary coded decimal code for transmit and receive frequencies enabling personnel holding a minimum class of radio operator permit to operate the radiotelephone. There is no need to enter the equipment and add circuitry to add channels. Channel program cards are inserted into a front panel-mounted card reader. Hence, channel capacity is limited only by the number of authorized frequencies; and the number of channel programmed cards on hand. Additional cards can be field programmed by means of a simple hand punch, or may be obtained preprogrammed by means of an automatic card punch.

18 Claims, 8 Drawing Figures

CARD-PROGRAMMED FREQUENCY CONTROL UNIT FOR A TRANSCEIVER

BACKGROUND OF THE INVENTION

This invention relates to radio transceivers and more particularly to a card-programmed frequency control unit for such transceivers.

U.S. Pat. No. 3,581,019 discloses therein a card-programmed control arrangement for a radiotelephone facility. A matrix of orthogonal conductors receives a card which is apertured, punched or embossed in accordance with the particular cross point of the matrix conductors which are to be connected to provide the desired channel or frequency of operation for both transmit and receive operations. The card itself as disclosed in the above cited patent is the component that makes the cross point connection through the programmed apertures, punches or embosses thereon. The matrix and associated card can be originally manufactured to produce a predetermined limited number of channels or frequency connections for transmit and receive frequencies. To increase the channel capacity in the arrangement of the above cited patent it will be necessary to enter the equipment and add conductors to the matrix to add additional channels or frequencies of operation. In addition, the card employed with this increase size matrix would have to be enlarged to properly make the cross point connection to utilize the added on channels or frequencies. This is a disadvantage of the arrangement of the above cited patent.

SUMMARY OF THE INVENTION

It is an object of the present invention to provide an improved card-programmed frequency control unit for a transceiver.

It is another object of the present invention to provide a card-programmed frequency control unit for a transceiver enabling personnel holding a minimum class of radio operator permit to operate the radio transceiver.

Still another object of the present invention is to provide a card-programmed frequency control unit for a transceiver where the channels or frequencies are limited only by the number of authorized channels or frequencies and the number of channel or frequency programmed cards on hand or capable of being field programmed by a simple hand punch thereby negating the need to enter the equipment and add circuitry to increase channel or frequency capacity.

A feature of the present invention is the provision of a card-programmed frequency control unit for a transceiver comprising: a housing for the unit including a front panel; a card reader having an input for cards to be read mounted to and behind the front panel; a slot in the front panel in registry with the input for the card reader; a card to be inserted in the slot for reading by the card reader, the card having programmed thereon a mode of operation, a transmit frequency and a receive frequency, the transmit frequency and the receive frequency being programmed according to a binary coded decimal code; the card reader having a first group of output conductors, a different conductor of the first group of conductors being provided for each of the possible binary bits capable of being programmed on the card to provide the transmit frequency and a second group of output conductors, a different conductor of the second group of conductors being provided for each of the possible binary bits capable of being programmed on the card to provide the receive frequency; a third group of output conductors, a different conductor of the third group of conductors being provided for each of the possible frequencies capable of being programmed for both transmit and receive operations; and a frequency selector circuit coupled between the first and second groups of conductors and the third group of conductors to couple the appropriate conductors of the first group of conductors, as determined by the transmit frequency programmed on the card, to associated conductors of the third group of conductors when transmission is enabled and to couple the appropriate conductors of the second group of conductors, as determined by the receive frequency programmed on the card, to associated conductors of the third group of conductors when receiving is enabled.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

The transceiver with which the card-programmed frequency control unit of the present invention is employed will be described with respect to a marine type radiotelephone which is a synthesized, auto-tuned 400 watt high frequency single sideband transceiver. It is to be noted, however, that the frequency control unit described herein is not limited to a marine radiotelephone transceiver, but may be used for other types of transceivers, such as land radiotelephone transceivers and the like.

The channels or frequencies of the marine radiotelephone transceiver are selected with 100 Hz (hertz) resolution for use in the high frequency maritime mobile frequency bands of 4 MHz (megahertz), 6 MHz, 8 MHz, 12 MHz, 16 MHz and 22 MHz bands and in the entire 1.6 MHz to 3.5 MHz band by the use of punched cards preprogrammed for the mode of operation and preprogrammed in a binary coded decimal code for the transmit and receive frequencies. The use of the preprogrammed punched cards enables personnel holding a minimum class of radio operator permit to operate the radiotelephone. In addition, the punched card programming technique offers easy field programmability. Additional channels or frequencies can be easily added in the field by the use of a simple hand punch to punch a card for the additional channels by authorized personnel either on-board the ship or ashore. Thus, the channel capacity of the radiotelephone associated with the card-programmed frequency control unit of the present invention is limited only by the number of authorized frequencies and the number of channel program cards on hand or capable of being field programmed by a simple hand punch. Thus, there is no need to enter the equipment and add circuitry to add channels.

Figure 1:
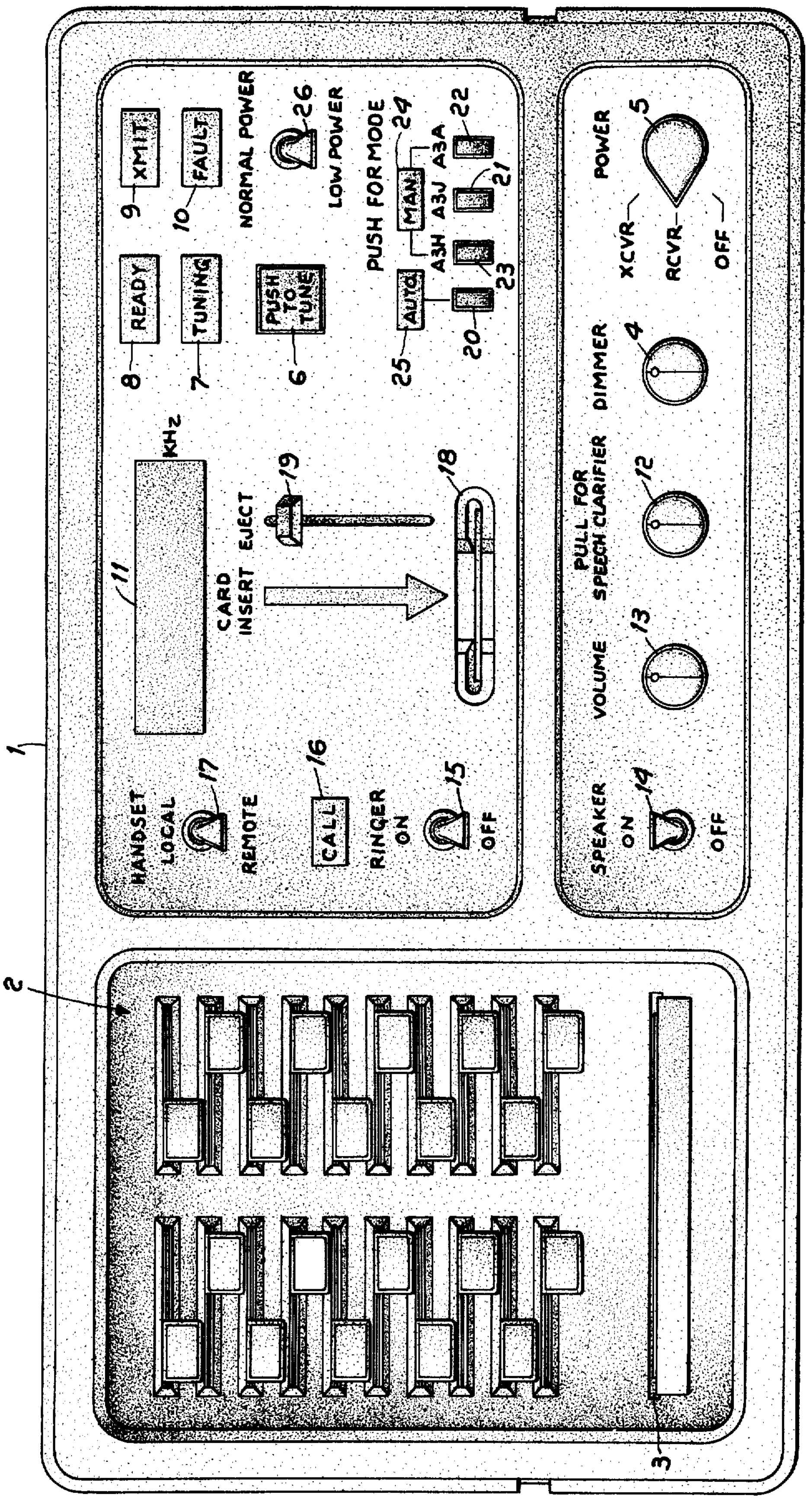
FIG. 1 is an elevational view of the front panel of the card-programmed frequency control unit in accordance with the principles of the present invention.

Referring to FIG. 1 there is illustrated therein the front panel 1 of a housing for the card-programmed frequency control unit of the present invention. The housing contains 20 compartments in a perpendicular relation to panel 1 and in communication with slots 2 to enable storage of 20 prepunched channel or frequency cards for easy access to the operator. A larger compartment also in a perpendicular relation to panel 1, is disposed below the compartments in communication with slots 2 and is in communication with slot 3 to store a channel logging chart so that the operator by looking at the logging chart can quickly identify the numbered card accessible in one of slots 2 that is preprogrammed for the desired mode of operation and for the desired channel or frequencies for both transmission and reception. Thus, the operator is enabled to quickly chose the proper prepunched card in storage.

The housing of the frequency control unit of the present invention also contains three printed circuit boards. The first printed circuit board contains the frequency display circuitry which interfaces logic commands from the front panel-mounted card reader to the light emitting diode (LED) frequency display integrated circuits. The second printed circuit board contains the handset control/ringer decoder circuit. The functions provided by the second printed circuit boards include switching between "local" handset control to "remote" handset control via a relay. Also this second printed circuit board controls illumination of the card storage area and control panel (excluding the LED frequency display) via the front panel dimmer control 4. A third function performed by the second printed circuit board is that it disables the following indicators when the power switch 5 is in the "RCVR" position. (1) Push to tune switch 6, (2) turning lamp 7, (3) ready lamp 8, (4) xmit lamp 9, and (5) fault lamp 10.

In addition, the second printed circuit board enables mounting an optional ringer decoder printed circuit board used to decode the 600 Hz/1500 Hz selective call signals used by the U.S. maritime mobile coast stations to call ships.

The third printed circuit board controls the transmit and receive frequency logic signal from the card reader such that:

a. With a channel card inserted in the card reader, the programmed frequency and transmit frequency is alternately selected as the push-to-talk handset control is released and actuated respectively with the transmitter in the "ready" condition.
b. With no channel card in the card reader, the circuitry on this third printed circuit board programs the transmit and receive frequency for 2182.0 KHz (kilohertz) which is the calling frequency and emergency frequency. This third printed circuit board also generates signals to indicate when a channel card is inserted or ejected from the card reader. These signals generated are the program change indicators.

The housing and panel 1 thereof provide all the controls and indicators necessary to operate the transceiver which will be described hereinbelow. Also provided by the housing are connectors for a local handset, a remote handset and an external radiotelephone alarm generator.

The operating controls and indicators present on front panel 1 will now be discussed.

Power switch 5 when placed in the off position disables the following major units of the radiotelephone transceiver, (1) the high voltage power supply, (2) the exciter/receiver, (3) the linear amplifier/antenna coupler and (4) the frequency control unit of the present invention. With power switch 5 in the RCVR position, the transceiver is in a receiver only operation and the push-to-talk switch is disabled thereby preventing transmission. When power switch 5 is in the XCVR position full transceiver operation is possible. A 60 second time delay between application of tube filament current and high voltage is provided. The timer is actuated as soon as power switch 5 is activated, even in the RCVR position.

Dimmer control 4 controls illumination of the control unit excluding the LED frequency display whose output appears in block 11.

Speech clarifier control switch 12 is pulled to clarify speech when receiving A3J or A3A mode signals.

Volume control 13 adjusts the audio volume of the receiver.

Speaker on/off switch 14 switches the local speaker on or off.

Ringer on/off switch 15 enables the operation of the optional ringer decoder (selective ringer) circuit.

Call lamp 16 indicates that a call was received. This lamp is extinguished by switching the ringer switch 15 to the OFF position. Handset local/remote switch 17 switches between local handset control and remote handset control.

Frequency display 11 indicates the transmit frequency when transmitting and the receive frequency when receiving as determined by the programmed card.

A card reader mounted on the rear of panel 1 in registry with slot 18 accepts the prepunched frequency/mode program cards.

Card eject control 19 ejects program cards when depressed.

Auto mode switch 20 when actuated causes the transceiver to provide the mode of operation A3A, A3J or A3H as preprogrammed on the frequency/mode card.

The manual A3J mode switch 21 provides a manual override for the auto mode programmed on the frequency/mode card.

The manual A3A mode switch 22 provides a manual override for the mode programmed on the program/mode card.

Manual A3H mode switch 23 provides manual override for the mode programmed on the frequency/mode card.

The manual mode lamp 24 indicates that the AUTO mode switch has been overridden. It should be noted that with no card in the card reader the 2182.0 KHz transmit and receive frequency and the A3H mode is automatically selected and cannot be overridden and hence the manual lamp will not light.

Auto mode lamp 25 indicates that the AUTO mode switch has been depressed.

The normal/low power switch 26 selects radio frequency output power as follows. In the normal position the RF output power is 400 watts, PEP (peak envelope power) maximum at 4 MHz and above. With switch 26 still in the normal position the output power is 150 watts PEP maximum below 4 MHz. When switch 26 is in the low power position the output power is 60 watts PEP maximum from 1.6 MHz to 22.7 MHz.

Push-to-tune button and lamp 6 indicates that the push-to-tune button must be depressed to initiate the tune cycle when the lamp is ON. When this switch is depressed the lamp is extinguished.

Tuning lamp 7 indicates that tuning is in progress. The lamp remains ON until the transmitter is READY, then extinguishes.

Ready lamp 8 indicates that the transmitter is ready for transmission. Transmission occurs when this lamp is ON and the user speaks upon actuation of the push-to-talk switch.

The xmit lamp 9 indicates that radio frequency is being transmitted and that the radio frequency in the antenna is being monitored.

Fault lamp 10 indicates that excessive voltage standing wave ratio (VSWR) exists on the antenna lead. When this lamp 10 lights transmission is automatically ceased and approximately 10 seconds later is automatically enabled permitting another transmission attempt if desired. The process is repeated until the fault is cleared.

Figure 2:
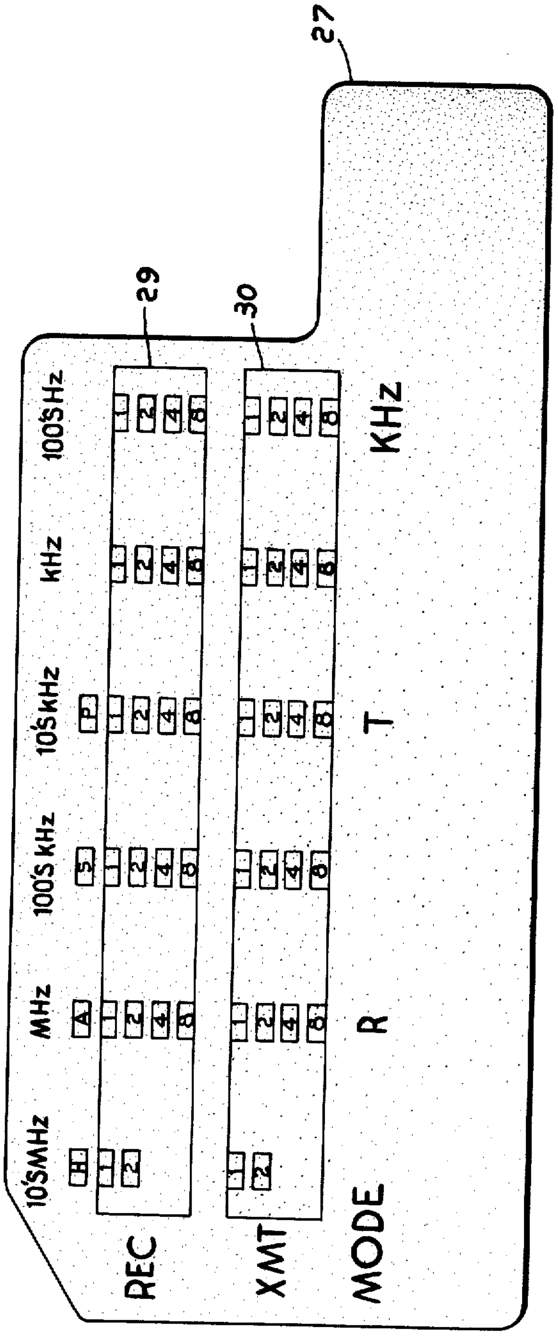
FIG. 2 is a bottom view of an unpunched card that may be programmed to control the frequency control unit in accordance with the principles of the present invention.
Figure 3:
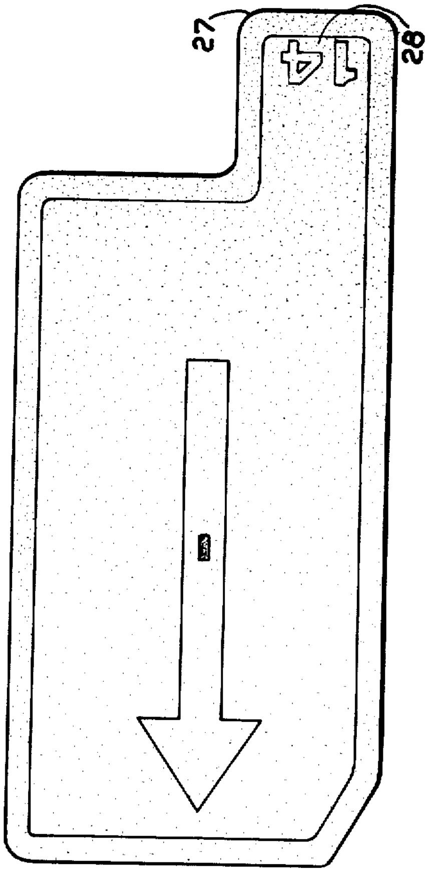
FIG. 3 is a top view of the card of FIG. 2.

Referring to FIG. 2, there is illustrated therein an unprogrammed card to be employed with the frequency control unit of the present invention and FIG. 3 shows the top of this card with a number applied to the tab 27 as indicated at 28. It is this number that enables the operator to check the channel logging chart stored in slot 3 and select the properly numbered card for the mode of operation and the transmit and receive frequencies keyed to this number on the logging chart. These numbers may be applied in the field at the operators discretion. In the event cards must be changed, either new cards may be obtained from the factory or depot, or unpunched cards can be field punched and the appropriate number applied to an adhesive label that is then fastened to tab 27.

Figure 4:
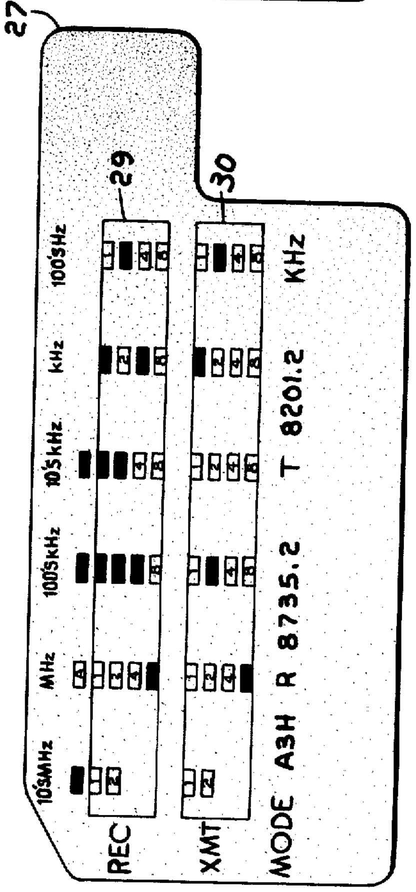
FIG. 4 is a programmed version of the card of FIG. 2.

As shown in FIGS. 2 and 4, the receive frequency and the transmit frequency are punched in a binary coded decimal code. In FIG. 4 the blockened punch area represents the areas that are actually punched to program the desired transmit and receive frequencies and the mode of operation. The numerals contained in the punch areas represent the weight of the binary bits of the binary code being employed. Reading from left-to-right on the bottom of the card the 10 MHz digit of the receive frequency is programmed in the first column in the REC rectangular area 29. The MHz digit is located in the second column and so forth with the 100's Hz digit being located in the sixth column. The transmit frequency is programmed similarly in the XMT rectangular area 30. The mode is programmed in the first two columns of the first row. H is punched for the A3H mode and A is punched for the A3A mode. As illustrated in FIG. 4 the mode of operation is the A3H mode since the H punch area has been punched. Neither the A or H is punched for the A3J mode of operation. The rectangles containing S and P in the first row are normally punched. When the S punch area is punched this indicates that a program card is inserted in the card reader and enables the mode commands. If no card is in the card reader or the sense punch area is not punched in the program card the A3H mode is automatically enabled. The P punch area provides a program output which is used to indicate when either a program card is inserted or ejected from the card reader. Also if no card is in the card reader the frequency of 2182.0 KHz is automatically selected for both the transmit and receive frequencies.

The mode, the receive frequency and the transmit frequency are printed near the bottom of the card as illustrated in FIG. 4. For factory produced cards, the printing may be accomplished by an addressograph printer. In the field this information can be printed on the matte-finished program cards by the operator.

Figure 5:
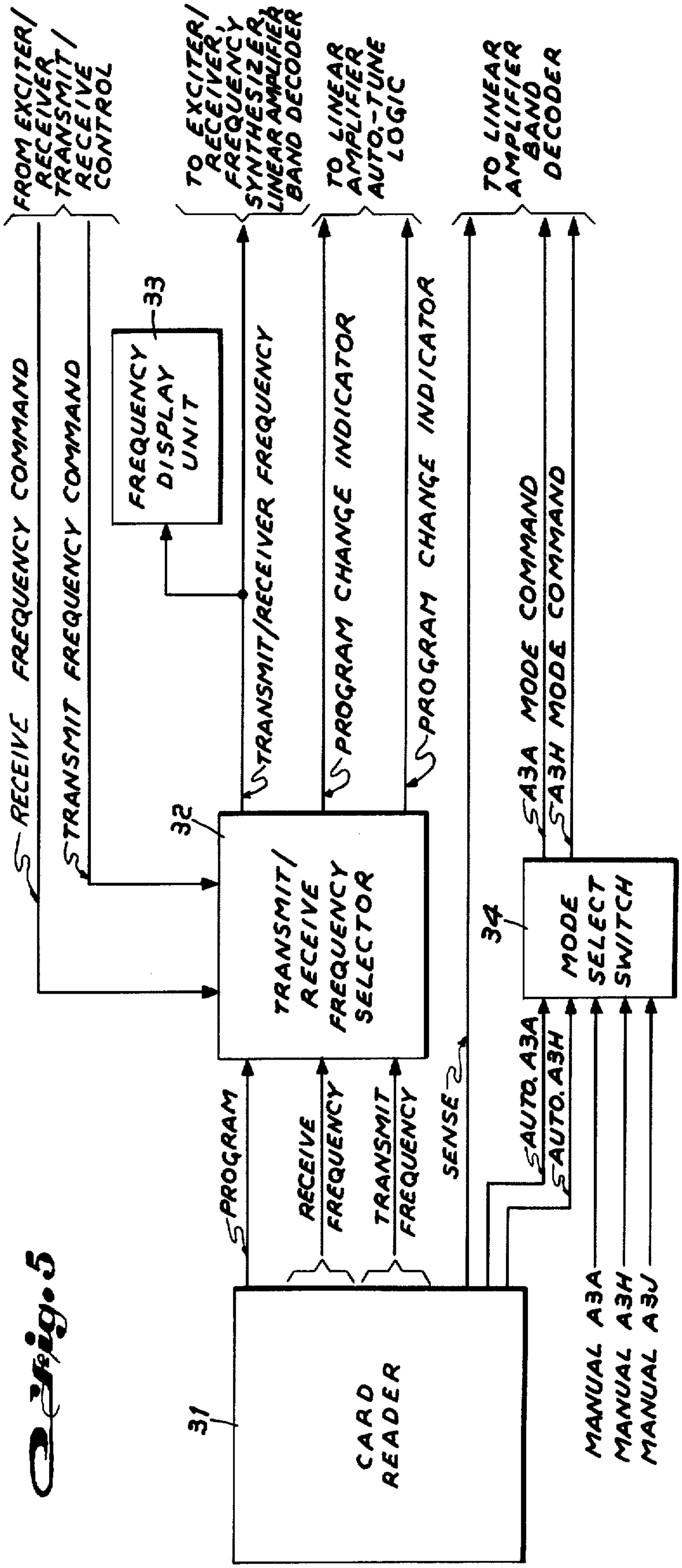
FIG. 5 is a block diagram of the card-programmed frequency control unit for a transceiver in accordance with the principles of the present invention.

Referring to FIG. 5 there is illustrated therein a block diagram of the card-programmed frequency control unit of the present invention. This control unit includes a card reader 31 mounted to panel 1 in registry with slot 18 to receive the programmed cards. Certain of the outputs of card reader 31, namely, the program signal, the receive frequency and the transmit frequency are coupled to transmit/receive frequency selector 32. Selector 32 provides the transmit/receive frequency for coupling to frequency display unit 33 whose read out appears in block 11 of FIG. 1 and also to the exciter/-receiver synthesizer, linear amplifier and band decoder. In addition two program change indicator signals are coupled to the linear amplifier autotune logic. The sense output of reader 31 is coupled directly to the linear amplifier band decoder. The auto A3A and A3H mode signals from reader 31 are coupled to mode selector switch 34. Mode selector switch 34 consists of front panel switches 20, 21, 22 and 23 interlocked. Switch 34 provides the A3A and A3H mode commands which are coupled to the linear amplifier band decoder. When there is no command output from reader 31 the A3J mode is automatically employed.

The card reader 31 may be a modified Model 61, 161 or 261 card reader produced by AMP Incorporated which are described in AMP Product Information Bulletin No. 621-9, Reprinted 1-73. The card reader provides simultaneously 22 bits for the transmit frequency, 22 bits for the receive frequency, 2 bits for the auto A3A and A3J modes, 1 bit for the sense signal and 1 bit for the program signal.

As mentioned previously the sense signal is used to indicate that a program card is inserted in card reader 31 and enables the mode commands. If no card is in the card reader or the sense (S) punch area is not punched in the program card, the A3H mode is automatically enabled.

The program signal is used to indicate when either a program card is inserted or ejected from card reader 31. Also, if no card is in the card reader, the 2182.0 KHz frequency is automatically selected for both the transmit and receive frequency. Normally, both S and P are punched on the program card.

Figure 6C:
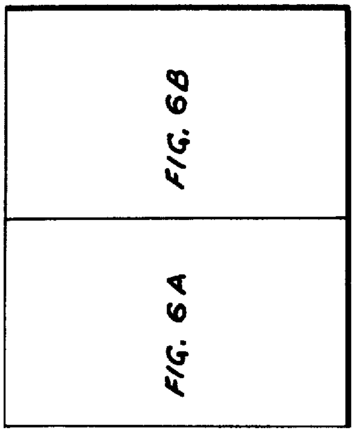
FIGS. 6A and 6B when organized as illustrated in FIG. 6C is a logic diagram of the transmit/receive frequency selector of FIG. 5.
Figure 6A:
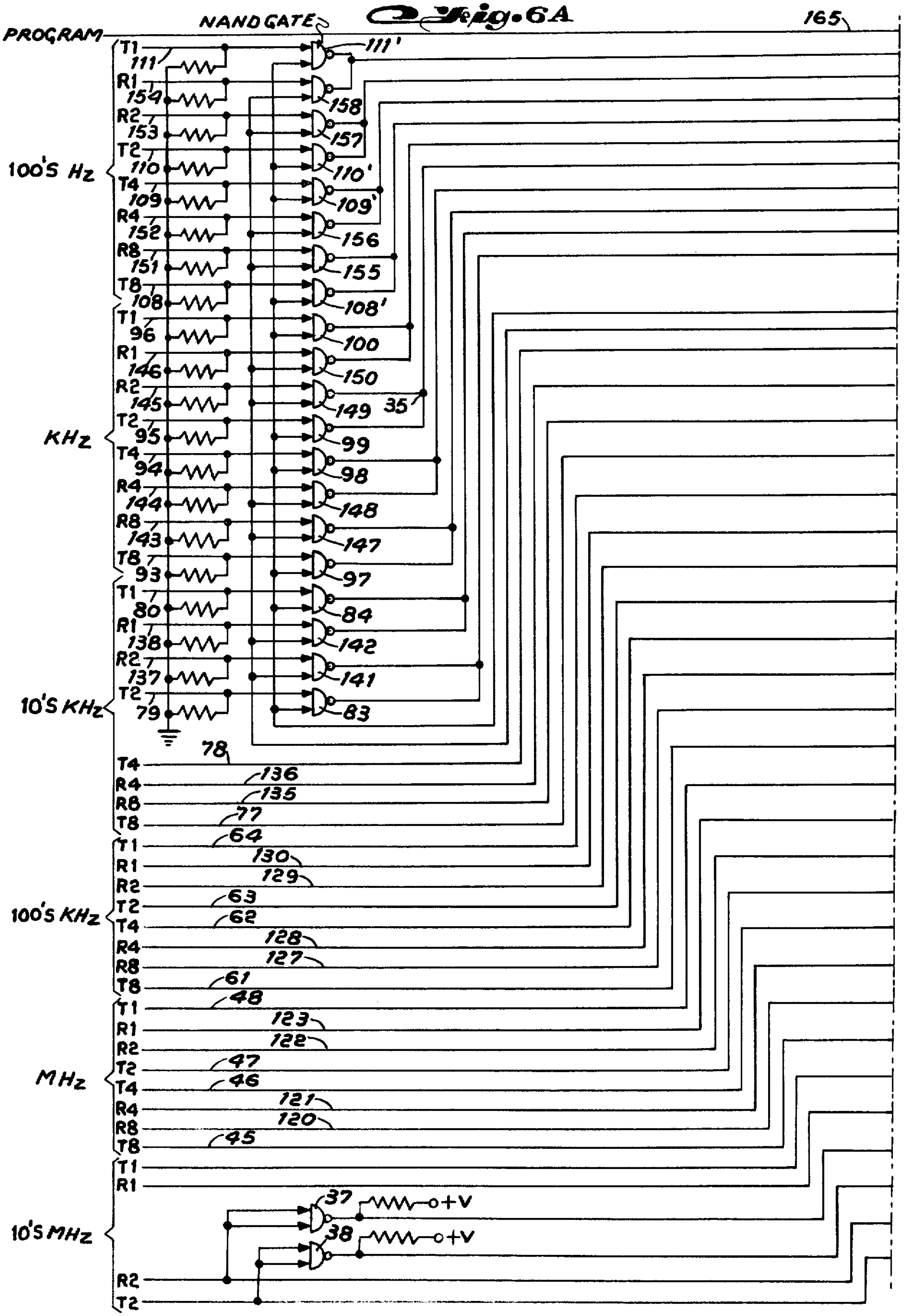
Figure 6B:
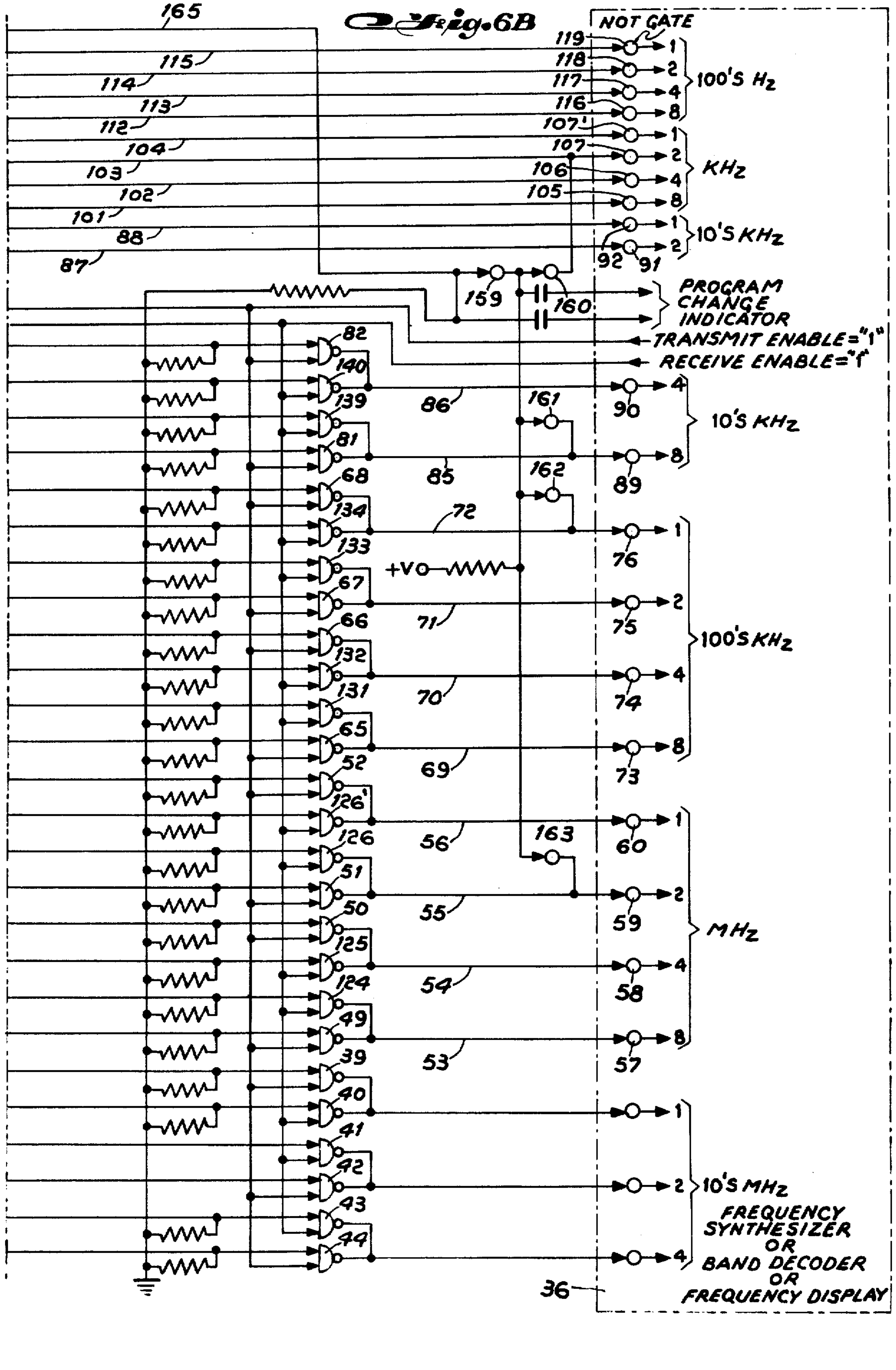

Referring to FIGS. 6A and 6B when organized as illustrated in FIG. 6C there is illustrated a logic diagram for implementing selector 32 of FIG. 5. A first group of conductors coming from reader 31 identified by letter T contains the binary coded decimal information for the transmit frequencies. A second group of conductors coming from card reader 31 identified by the letter R contain the binary coded decimal information for the receive frequencies. The number following the prefix T and R indicates the weight of the bit associated with each binary coded decimal digit coming from reader 31. Each of the frequency information conductors coming from reader 31 are coupled to one input of an NAND gate, the other input thereof being coupled to either a conductor carrying a transmit enable signal or a receive enable signal depending on whether the NAND gate is connected to a T conductor or a R conductor. The enable signal is a binary "1" signal. It will be noted that the NAND gates coupled to a transmit conductor and a receive conductor of the same BCD weight and digit are wired-OR such as at 35. To permit this wired-OR connection the NAND gates are open collector output NAND gates which will provide a NAND function output only when the enable signal (a binary 1) is applied to the enable input of the NAND gate. When a binary 0 condition is on the enable input there will be a binary 1 output.

The conductor from the OR-wired connection of each pair of NAND gates wired-OR forms a third group of conductors which carry thereon the transmit frequency binary coded decimal representation in complemented form when the transmission enable signal is present and the receive frequency binary coded decimal representation in complemented form when the receive enable is present. The various conductors of the third group of conductors are coupled to NOT gates in the frequency synthesizer, and frequency display unit so as to provide the input binary coded decimal representation of the frequency involved as received from the card reader. These NOT gates are illustrated within the broken line block 36.

It should be noted that in the 10's MHz digit there is only weight 1 and weight 2 binary bits involved while the output from the selector 32 for this digit has a weight 1, weight 2 and weight 4 binary bit. This is necessary since there is an offset in the frequency synthesizer of binary weight 2 so as to provide the desired frequency. Thus, the programmed bits from the reader 31 have weights of 0, 1 and 2 while the weight of the bits controlling the frequency synthesizer and band decoder must have binary weights of 2, 3 or 4 due to the offset required. To enable an operator to punch the 10's MHz portion of the program card without considering the offset, NAND gates 37–44 decode to compensate for this offset.

Employing the programmed card of FIG. 4 the operation of the logic circuitry of FIGS. 6A and 6B will be presented. First consider the transmit frequency of 8201.2 KHz. The input from card reader 31 for the MHz digit will appear on conductor 45 as a binary 1 and on conductors 46, 47 and 48 as binary 0's. These signals are coupled to NAND gates 49, 50, 51 and 52, respectively. The resultant output on conductors 53, 54, 55 and 56, when a transmit enable is present, will be the complement of the input binary coded decimal bits which would then be inverted to provide the input binary bits in NOT gates 57, 58, 59 and 60, respectively. For the 100's KHz digit conductor 61 would have a binary 0 condition thereon, conductor 62 would have a binary 0 present thereon, conductor 63 would have a binary 1 condition thereon and conductor 64 would have a binary 0 thereon. These conductors are connected to NAND gates 65, 66, 67 and 68, respectively. When a transmit enable signal is present an output which is a complemented version of the input binary bits are present on conductors 69, 70, 71 and 72, respectively. The complemented binary coded decimal information is reinverted to the input binary bits in NOT gates 73, 74, 75 and 76 respectively. For the 10's KHz digit, input bits would appear on conductors 77, 78, 79 and 80 as a binary 0 condition. These conductors are connected to NAND gates 81, 82, 83 and 84, respectively. When the transmit enable signal is present the complemented binary bits would appear on conductors 85, 86, 87 and 88, respectively, with these complemented binary bits being reinverted to the original input binary bits by NOT gates 89, 90, 91 and 92, respectively. The KHz digit binary bit inputs would appear on conductors 93, 94, 95 and 96. Conductors 93-95 would have a binary 0 condition while conductor 96 would have a binary 1 condition. These conductors are connected to NAND gates 97, 98, 99 and 100. The complemented version of the input binary bits appears on conductors 101, 102, 103 and 104 when a transmit enable is present with these complemented binary bits being reinverted to the original input binary bits in NOT gates 105, 106, 107 and 107'. The 100's Hz digit binary bit inputs would appear on conductors 108, 109, 110 and 111. Conductors 108, 109 and 111 would have a binary 0 condition thereon while conductor 110 would have a binary 1 condition thereon. The complemented version of the binary bits appears on conductors 112, 113, 114 and 115, respectively, when a transmit enable is present at the enable input of NAND gates 108', 109', 110' and 111', respectively. The binary bits are reinverted by NOT gates 116, 117, 118 and 119. In this manner the binary signal representing the transmit frequency of 8201.2 KHz is presented for utilization in the frequency synthesizer, band decoder and frequency display unit.

The programmed receive frequency of 8735.2 KHz of the card shown in FIG. 4 causes the selector 32 to operate as follows. The binary bits for the MHz digit appears on conductors 120, 121, 122 and 123. Conductor 120 has a binary 1 condition thereon while conductors 121–123 have a binary 0 condition thereon. These conductors are connected to NAND gates 124, 125, 126 and 126' with the complemented input binary bits appearing on conductors 53–56, respectively. The complemented bits are operated on by NOT gates 57–60 to obtain the original input binary bits. The 100's KHz digit binary bit inputs appear on conductors 127, 128, 129 and 130. Conductors 128–130 have a binary 1 condition thereon and conductor 127 has a binary 0 condition thereon. These conductors are connected to NAND gates 131, 132, 133 and 134. The complemented binary bits appear on conductors 69-72, respectively, when the receive enable is present with the original binary bits being obtained at the outputs of NOT gates 73–76. The 10's KHz digit binary bit inputs appear on conductors 135, 136, 137 and 138. These conductors are connected to NAND gates 139, 140, 141 and 142. The complemented binary bits appears on conductors 85–88, respectively, when a receive enable is present with the complemented binary bits being reinverted to the original input binary bits by NOT gates 89–92. The KHz digit binary bit inputs appear on conductors 143, 144, 145 and 146. Conductors 143 and 145 have a binary 0 condition thereon while conductors 144 and 146 have a binary 1 condition thereon. These conductors are connected to NAND gates 147, 148, 149 and 150. The output of these NAND gates, when a receive enable is present, is the complemented version of the input binary bits and appear on conductors 101–104. The original input binary bits are obtained from NOT gates 105, 106, 107 and 107'. The 100's Hz digit binary bit inputs appear on conductors 151, 152, 153 and 154. Conductors 151, 152 and 154 have a binary 0 condition thereon while conductor 153 has a binary 1 condition thereon. These conductors are connected to NAND gates 155, 156, 157 and 158. Upon occurrence of the receive enable the complement of the input binary bits is present on conductors 112–115 and the original input binary bits are obtained at the output of NOT gates 116–119. In this manner the programmed receive frequency in binary form is coupled to the frequency synthesizer, band decoder and frequency display by the third group of conductors at the output of the paired NAND gates. Thus, the third group of conductors is employed in common for the binary bits representing both the transmit and receive frequencies.

As was previously mentioned the PROGRAM signal indicates the presence or absence of a punched card in the card reader. When no card is in the card reader the frequency 2182.0 KHz is automatically selected for both the transmit and receive frequencies. This is accomplished by employing NOT gates 159, 160, 161, 162 and 163. When a card is present in the card reader a binary 1 will appear on conductor 165 which after passing through NOT gate 159, will be a binary 0 which in turn disables gates 160, 161, 162 and 163. However, with a binary 0 condition indicating an absence of a card in the card reader a binary 1 condition will appear at the output of NOT gate 159, resulting in a binary 0 condition at the output of gates 160, 161, 162 and 163 thus indicating a programmed frequency of 2182.0 KHz for both transmit and receive.

While we have described above the principles of our invention in connection with specific apparatus it is to be clearly understood that this description is made only by way of example and not as a limitation to the scope of our invention as set forth in the objects thereof and in the accompanying claims.

We claim:

1. A card-programmed frequency control unit for a transceiver comprising:
   - a housing for said unit including a front panel;
   - a card reader having an input for cards to be read mounted to and behind said front panel;
   - a slot in said front panel in registry with said input for said card reader;
   - a card to be inserted in said slot for reading by said card reader, said card containing thereon a programmed indication selectively representing the transmit or receive mode of operation and a programmed pair of binary coded decimal codewords representing a transmit and receive frequency;
   - said card reader having a first group of output conductors, a different conductor of said first group of conductors for each of the possible binary bits in the code word representing said transmit frequency and a second group of output conductors, a different conductor of said second group of conductors for each of the possible binary bits in the code word representing said receive frequency;

- a third group of output conductors, a different conductor of said third group of conductors for each of the possible binary bits in said codewords representing selectively the transmit or receive frequency; and
   - a frequency selector circuit coupled between said first and second groups of conductors and said third group of conductors to couple the appropriate conductors of said first group of conductors, as determined by said transmit frequency codeword, to associated conductors of said third group of conductors during said transmit mode and to couple the appropriate conductors of said second group of conductors, as determined by said receive frequency codeword, to associated conductors of said third group of conductors during said receive mode.

2. A control unit according to claim 1, further including
   - a mode select switch coupled to said card reader responsive to said mode of operation indication to form a mode of transmission command signal.

3. A control unit according to claim 2, further including
   - manual mode of operation switches on said front panel connected to said mode select switch to override said mode of transmission indication.

4. A control unit according to claim 1, wherein
   - said housing contains therein a plurality of compartments to store for ready access a plurality of differently programmed cards and a single larger compartment for ready access to a card logging chart, and
   - said front panel contains a plurality of slots each in registry with a different one of said plurality of compartments to provide access to each of said plurality of differently programmed cards and a single larger slot under said plurality of slots in registry with said larger compartment to provide access to said card logging chart.

5. A control unit according to claim 1, further including
   - a digital frequency display unit contained in said housing and having a frequency display output present in said front panel, said display unit being connected to said third group of output conductors to provide a transmit frequency display during the transmit mode and to provide a receive frequency display during the receive mode.

6. A control unit according to claim 1, wherein said frequency selector circuit includes
   - logic circuitry coupled between said first and second group of conductors and said third group of conductors.

7. A control unit according to claim 1, wherein said frequency selector circuit includes
   - a first plurality of logic gates each having an output and two inputs, each of said first plurality of logic gates having one of said two inputs connected to a different conductor of a selected one of said first and second groups of conductors,
   - a transmit enable signal conductor coupled to the other of said two inputs of each of said first plurality of logic gates having said one of said two inputs connected to said first group of conductors, a receive enable signal conductor coupled to the other of said two inputs of each of said first plurality of logic gates having said one of said two inputs connected to said second group of conductors, and a wired-OR connection between the output of each pair of said first plurality of logic gates connected to one conductor of said first group of conductors and to one conductor of said second group of conductors carrying the same weight binary bit in a frequency range, each of said wired-OR connections being connected to a different conductor of said third group of conductors.

8. A control unit according to claim 7, further including a second plurality of logic gates coupled between said card reader and certain conductors of said third group of conductors to provide a given binary output which will result in a given frequency of operation for said transceiver when said card reader has no programmed card inserted therein.

9. A control unit according to claim 8, wherein each of said second plurality of logic gates include a NOT gate.

10. A control unit according to claim 9, wherein each of said first plurality of logic gates include an open collector output NAND gate.

11. A control unit according to claim 10, further including

NOT gates connected to the output of each conductor of said third group of conductors.

12. A control unit according to claim 11, further including a mode select switch coupled to said card reader responsive to said mode of operation indication to form a mode of transmission command signal.

13. A control unit according to claim 12, further including manual mode of operation switches on said front panel connected to said mode select switch to override said mode of transmission indication.

14. A control unit according to claim 13, wherein said housing contains therein a plurality of compartments to store for ready access a plurality of differently programmed cards and a single larger compartment for ready access to a card logging chart, and said front panel contains a plurality of slots each in registry with a different one of said plurality of compartments to provide access to each of said plurality of differently programmed cards and a single larger slot under said plurality of slots in registry with said larger compartment to provide access to said card logging chart.

15. A control unit according to claim 14, further including a digital frequency display unit contained in said housing and having a frequency display output present in said front panel, said display unit being connected to said third group of output conductors to provide a transmit frequency display during the transmit mode and to provide a receive frequency display.

16. A control unit according to claim 1, further including a plurality of logic gates coupled between said card reader and certain conductors of said third group of conductors to provide a given binary coded decimal output which will result in a given frequency of operation for said transceiver when said card reader has no programmed card inserted therein.

17. A control unit according to claim 16, wherein each of said plurality of logic gates include a NOT gate.

18. A control unit according to claim 17, wherein each of said certain conductors of said third group of conductors have NOT gates connected to the outputs thereof.

* * * * *